US010315392B2

(12) United States Patent
Arici et al.

(10) Patent No.: US 10,315,392 B2
(45) Date of Patent: Jun. 11, 2019

(54) SLIP-RESISTANT GARMENTS AND MANUFACTURING PROCESSES THEREOF (71) Applicant: FAIT PLAST S.p.A., Cellatica (IT)

(72) Inventors: Andrea Arici, Gussago (IT); Guido Arici, Castel Mella (IT); Stefano Della Puppa, Abbiategrasso (IT)

(73) Assignee: FAIT PLAST S.P.A. (IT)

( * ) Notice: Subject to any disclaimer, the term of this patent is extended or adjusted under 35 U.S.C. 154(b) by 586 days.

(21) Appl. No.: 14/908,353

(22) PCT Filed: Jul. 30, 2014

(86) PCT No.: PCT/IB2014/063551
§ 371 (c)(1),
(2) Date: Jan. 28, 2016

(87) PCT Pub. No.: WO2015/015438
PCT Pub. Date: Feb. 5, 2015

(65) Prior Publication Data
US 2016/0167344 A1 Jun. 16, 2016

(30) Foreign Application Priority Data

Aug. 2, 2013 (IT) .............................. MI2013A1326

(51) Int. Cl.
*B32B 25/10* (2006.01)
*C09J 153/02* (2006.01)
(Continued)

(52) U.S. Cl.
CPC ............ *B32B 25/10* (2013.01); *A41B 11/008* (2013.01); *A41D 1/04* (2013.01); *A41D 1/06* (2013.01);
(Continued)

(58) Field of Classification Search
CPC .. B32B 25/10; B32B 7/06; B32B 7/12; B32B 27/08; B32B 27/22; B32B 27/302;
(Continued)

(56) References Cited

U.S. PATENT DOCUMENTS

| 5,948,707 A | 9/1999 | Crawley et al. |
| 8,677,513 B2 | 3/2014 | Mathis et al. |

(Continued)

FOREIGN PATENT DOCUMENTS

| CN | 1274550 A | 11/2000 |
| CN | 101255262 A | 9/2008 |

(Continued)

OTHER PUBLICATIONS

English-language translation of Chinese Office Action and Search Report dated Sep. 28, 2017, in corresponding Chinese Application No. 2014800428205, 10 pages.

(Continued)

*Primary Examiner* — Cephia D Toomer
(74) *Attorney, Agent, or Firm* — MH2 Technology Law Group LLP (57) ABSTRACT A slip-resistant garment may include: at least one textile structure; and/or at least one slip-resistant portion coupled to the at least one textile structure. The at least one slip-resistant portion may include at least one thermoplastic polymer selected from among: (a) block copolymers of styrene; (b) copolymers of ethylene with at least one $C_3$-$C_{12}$ alpha-olefin; (c) copolymers of at least one butene with at least one diene; or (d) copolymers of ethylene with at least one ester having an ethylene unsaturation selected from among: $C_1$-$C_8$ alkyl acrylate, $C_1$-$C_8$ alkyl methacrylates, or vinyl $C_2$-$C_8$ carboxylates. The copolymers of ethylene with at least one $C_3$-$C_{12}$ alpha-olefin further include at least one dienic termonomer.

20 Claims, 4 Drawing Sheets (51) Int. Cl.
*B32B 7/06* (2019.01)
*B32B 7/12* (2006.01)
*B32B 27/08* (2006.01)
*B32B 27/22* (2006.01)
*B32B 27/30* (2006.01)
*B32B 27/32* (2006.01)
*A41B 11/00* (2006.01)
*A41D 1/04* (2006.01)
*A41D 1/06* (2006.01)
*B32B 1/08* (2006.01)
*B32B 7/08* (2019.01)
*B32B 25/14* (2006.01)
*C08L 23/12* (2006.01)

(52) U.S. Cl.
CPC ............... *B32B 1/08* (2013.01); *B32B 7/06* (2013.01); *B32B 7/08* (2013.01); *B32B 7/12* (2013.01); *B32B 25/14* (2013.01); *B32B 27/08* (2013.01); *B32B 27/22* (2013.01); *B32B 27/302* (2013.01); *B32B 27/327* (2013.01); *C09J 153/025* (2013.01); *A41D 2400/80* (2013.01); *B32B 2250/02* (2013.01); *B32B 2307/51* (2013.01); *B32B 2307/536* (2013.01); *B32B 2307/744* (2013.01); *B32B 2307/748* (2013.01); *B32B 2437/00* (2013.01); *C08L 23/12* (2013.01); *C08L 2207/14* (2013.01)

(58) Field of Classification Search
CPC .......... B32B 27/327; B32B 1/08; B32B 7/08; B32B 25/14; B32B 2307/536; B32B 2307/51; B32B 2307/748; B32B 2437/00; B32B 2250/02; B32B 2307/744; C09J 153/025; A41B 11/008; A41D 1/04; A41D 1/06; A41D 2400/80; C08L 23/12; C08L 2207/14

See application file for complete search history.

(56) References Cited

U.S. PATENT DOCUMENTS

| 2003/0190442 | A1* | 10/2003 | Campbell | A43B 3/16 428/35.2 |
| 2003/0220048 | A1 | 11/2003 | Toro et al. | |
| 2003/0232556 | A1 | 12/2003 | Toro et al. | |
| 2005/0008669 | A1* | 1/2005 | Chen | A01K 85/00 424/401 |
| 2007/0000006 | A1 | 1/2007 | Jordan et al. | |
| 2010/0065065 | A1 | 3/2010 | Johnston | |

FOREIGN PATENT DOCUMENTS

| EP | 1008310 A1 | | 6/2000 |
| GB | 2297030 | * | 7/1996 |
| JP | 4979761 B2 | | 7/2012 |
| MX | 2007012135 A | | 11/2007 |

OTHER PUBLICATIONS

International Search Report PCT/ISA/210 for International Application No. PCT/IB2014/063551, dated Jan. 8, 2015.
Written Opinion of the International Searching Authority PCT/ISA/237 for International Application No. PCT/IB2014/063551, dated Jan. 8, 2015.
English-language translation of Third Chinese Office Action and Search Report dated Mar. 29, 2019, in corresponding Chinese Application No. 201480042820.5, 13 pages.

* cited by examiner

SLIP-RESISTANT GARMENTS AND MANUFACTURING PROCESSES THEREOF

CROSS-REFERENCE TO RELATED APPLICATION(S)

This application is a national stage entry from International Application No. PCT/IB2014/063551, filed on Jul. 30, 2014, in the Receiving Office of the International Bureau of the World Intellectual Property Organization ("WIPO") and published as International Publication No. WO 2015/015438 A1, which claims priority from Italian Patent Application No. MI2013A001326, filed on Aug. 2, 2013, in the Italian Patent and Trademark Office, the entire contents of both of which are incorporated herein by reference.

The present invention regards a slip-resistant garment and the manufacturing process thereof.

As known, in the clothing industry it is sometimes required that the worn garments remain in position as much as possible with respect to the body of the user thereof, i.e. without slipping on the skin (if the garment is at direct contact therewith) or slide with respect to other worn garments and with which the garment is at contact.

Such need, in particular, occurs in the stockings industry (stockings and pantyhose), the underwear garments industry, the containment garments industry and shapewear garments industry (e.g. shapewear sheath), sports garments (so-called active-wear) (e.g. cycling or racing shorts) and formal attire (e.g. shirt waist fastener).

Analogous needs also arise in the textile-medical industry where it is required that the garments, such as for example braces, bandages, anti-phlebitis-antithrombosis medical stockings, etc., remain the longest possible in the initial position once worn by the user.

In the state of the art, there are available various solutions aimed at avoiding the slipping of a garment on the skin or the slipping thereof with respect to another garment or substrate.

For the purposes of the present description, the terms "slipping" and "sliding" are used in an interchangeable manner to indicate the mutual movement of a garment with respect to the body of a user (if the garment is at direct contact with the skin of the user) or with respect to another textile substrate (e.g. another garment) with which the garment is at contact when it is worn by the user.

Currently, the solution most used for avoiding the slipping of a garment, in particular in the stockings industry, is applying a slip-resistant element, generally made up of a layer of a silicone elastic polymeric material, on the portion of garment that is intended to be provided with slip-resistant properties.

Some examples of textile articles known in the state of the art which include a slip-resistant element comprising an elastic silicone layer are the following:

shorts (above and below the knee) and sports jerseys (long or short sleeves) of the type used, for example, in the type of sports that provide for the continuous movement of the legs and arms, such as cycling and running. In these garments, the silicone layer is arranged in proximity of the hem of the leg or sleeve, in the internal part (i.e., the part facing towards the body of the user), so as to maintain the fabric in position with respect to the leg or the arm of the user, reducing the slipping thereof on the skin (or any other underlying garment) and preventing the rolling of the free end (so-called curling);

light women stockings (pantyhose), for example long up to the thigh (so-called "thigh high stockings"), generally made using polyamide yarns combined with elastomeric yarns. The silicone layer is normally coupled to a fabric layer (e.g. lace), which is sewn in proximity of the hem of the leg of the stockings. The contact between the silicone layer and the leg allows the stockings to remain in position, stretched, without forming creases;

textile braces, for example for immobilising or supporting joints (e.g. the ankle, knee, wrist and elbow). The silicone layer, additionally to other elements, such as tensioning and Velcro closing elements, maintains the brace in the correct position;

underwear garments for containment and shapewear purposes. In these garments, the silicone layer is applied, for example, around the leg, beneath the breast, around the waist or around the thighs.

In the aforementioned items of the state of the art, the slip-resistant silicone element may be made, for example, by applying a layer of a liquid polymerizable composition on the surface of the fabric which forms the garment and, subsequently, by polymerising said composition up to forming a silicone elastic layer (solid).

Alternatively, a preformed elastic silicone slip-resistant element may be fixed to the garment by stitching or through an adhesive (e.g. a layer of glue).

Alternatively to the application of a silicone layer, the slip-resistant effect may be obtained by introducing elastic yarns, or elastic yarn fabrics in the structure of the fabric which forms the garment, through knitting, sewing or embroidery processes. The presence of these elastic yarns and/or elastic textiles reduces the slipping of the garment, at contact with the body of the user.

The slip-resistant elements of the state of the art have various drawbacks. The use of silicone polymers, in particular, reveals drawbacks of ecological, health and economic type.

The processes for the production and application of silicone slip-resistant portions to the fabrics, for example, are accompanied by the formation of bad smelling or even harmful emissions, which lead to the adoption of expensive and cumbersome aspiration and purification treatment systems of the gaseous releases.

Another drawback of the silicone material is related to the fact that a not negligible percentage of the users is sensitive to the contact of the skin with these materials. In these cases, the prolonged contact of the skin with such slip-resistant materials causes the occurrence of irritation to the skin and hyper-sensitiveness, in particular when the garments are worn for activities lasting for a long period of time or which imply an intense sweating by the user.

In addition, in terms of the quality of the garments the silicone slip-resistant elements and the relative methods of application to the fabrics have a negative impact on the initial characteristics of the garment, for example modifying its thickness, the hand and the elastic characteristics.

In addition, in cases where the slip-resistant elements are applied through sewing processes, such processes imply additional machining steps which increase the costs of the end product, besides representing a limitation to the performance of the production process (for example, the sewing time is one of the most costly factors in the tailoring and clothing industry).

In case of slip-resistant effect garments to be worn at direct contact with the skin, such as for example stockings, there then arises the problem related to the fact that it is possible to guarantee a suitable slip-resistant effect solely if the slip-resistant portion exerts a sufficiently high compression action on the part of the body on which the garment is worn. The use of garments that exert a high compression however creates high discomfort for the user and, in some cases (e.g. medical stockings), it may alter the normal blood circulation due to the so-called "tourniquet" effect.

In addition, the silicone materials used in the state of the art following the continuous and prolonged use, are subjected to the deterioration of the initial elasticity performance, compression and hence the slip-resistant ability. Such drawbacks reduce the useful life of the slip-resistant garments on which these materials are used. The deterioration is due to the progressive and cumulative yields of the ensuing materials as well as the repeated "extension-recovery" cycles of the elastic layers associated with the operations of wearing and removing the garment and the long periods of stay in high tension conditions during use.

In addition, the elastic performance of the silicone materials deteriorates progressively even following repeated washings and exposure to UV rays.

In the light of the state of art outlined above, it is clear that there arises the need to be able to have a slip-resistant garment capable of at least partly overcoming the drawbacks mentioned above.

The main object of the present invention is thus to provide a slip-resistant garment wherein the slip-resistant properties are conferred through a material substantially without silicone materials.

A further object of the present invention is to provide a slip-resistant garment, which once worn, is capable of remaining substantially in the worn position or however opposing a certain resistance to the slipping.

A second object of the present invention is to provide a slip-resistant garment, whose slip-resistant action is exerted through the friction of the slip-resistant material on the skin or on textile substrates.

A further object of the present invention is to provide a slip-resistant garment that does not exert an excessive compression on the body of the user, so as to avoid the "tourniquet" effect.

A further object of the present invention is to provide a slip-resistant garment wherein the portion which produces the slip-resistant effect is such not to have any substantial impact on the aspect and on the initial characteristics of the garment (e.g. thickness, hand and elastic characteristics, etc).

A further object of the present invention is to provide a slip-resistant garment which, when worn, does not irritate the skin of the user, as it instead occurs with the silicone-based slip-resistant materials.

A further object of the present invention is to provide a process for preparing a slip-resistant garment that is easy to implement, inexpensive and with low environmental impact.

Now, the Applicant has discovered that these and other goals that will be apparent to a person skilled in the art may be attained by using a slip-resistant material based on an olefin and/or styrene polymer and, thus, substantially without silicone material.

According to a first aspect, the present invention regards a slip-resistant garment comprising at least one textile structure and at least one slip-resistant portion coupled to said textile structure, said slip-resistant portion comprising at least one thermoplastic polymer selected from among:

(a) block copolymers of styrene,
(b) copolymers of ethylene with at least one $C_3$-$C_{12}$ alpha-olefin, possibly with at least one dienic termonomer,
(c) saturated or semi-saturated copolymers of at least one butene with at least one diene,
(d) copolymers of ethylene with at least one ester having an ethylene unsaturation selected from among: $C_1$-$C_8$ alkyl acrylates, $C_1$-$C_8$ alkyl methacrylates and vinyl $C_2$-$C_8$ carboxylates.

According to a second aspect, the present invention regards a manufacturing process of the aforementioned slip-resistant garment comprising the steps of:
providing a textile structure;
coupling to said textile structure at least one slip-resistant portion, said slip-resistant portion comprising at least one thermoplastic polymer selected from among:
(a) block copolymers of styrene,
(b) copolymers of ethylene with at least one $C_3$-$C_{12}$ alpha-olefin, possibly with at least one dienic termonomer,
(c) saturated or semi-saturated copolymers of at least one butene with at least one diene,
(d) copolymers of ethylene with at least one ester having an ethylene unsaturation selected from among: $C_1$-$C_8$ alkyl acrylates, $C_1$-$C_8$ alkyl methacrylates and vinyl $C_2$-$C_8$ carboxylates.

According to a further aspect, the present invention regards the use of a polymeric material comprising at least one thermoplastic polymer selected from among:
(a) block copolymers of styrene;
(b) copolymers of ethylene with at least one $C_3$-$C_{12}$ alpha-olefin, possibly with at least one dienic termonomer,
(c) saturated or semi-saturated copolymers of at least one butene with at least one diene,
(d) copolymers of ethylene with at least one ester having an ethylene unsaturation selected from among: $C_1$-$C_8$ alkyl acrylates, $C_1$-$C_8$ alkyl methacrylates and vinyl $C_2$-$C_8$ carboxylates,
for preventing or reducing the slipping of a garment on the skin or on a textile substrate.

For the purposes of the present invention the term "garment" refers to an item adapted to be worn by a user comprising a textile structure based on fibres or yarns of natural, synthetic or artificial origin, including items obtained through weaving, knitting and non-woven fabric (TNT) substrates.

The characteristics and the advantages of the present invention shall be more apparent from the following exemplifying and non-limiting description with reference to the attached schematic drawings wherein.

With reference to the attached figures, a slip-resistant garment, according to the present invention is indicated in its entirety with 1.

The slip-resistant garment according to the present invention is suitable for several uses, mainly in the clothing industry and in the medical textile industry, in particular the stockings industry, underwear industry, containment and shapewear garments industry as well as sports garments industry.

Examples of garments that can be conferred the slip-resistant effect according to the present invention are: long socks, short socks (FIG. 2), pantyhose (FIG. 3), half-foot socks (so-called "invisible socks") (FIG. 1), thigh high stocks (FIG. 3), shape-wear or containment garments (e.g. sheaths, girdle, etc.), formal garments (e.g. shirt waist fastener) or, in the sports garments industry, cycling or racing shorts. Further examples of garments that may be conferred slip-resistant effect according to the present invention are fabric braces (FIG. 4), for example for immobilising or supporting joints (e.g. ankle, knee, wrist and elbow).

According to a preferred embodiment, the slip-resistant garment 1 is a half foot sock, commonly referred to as "invisible socks".

Figure 1:
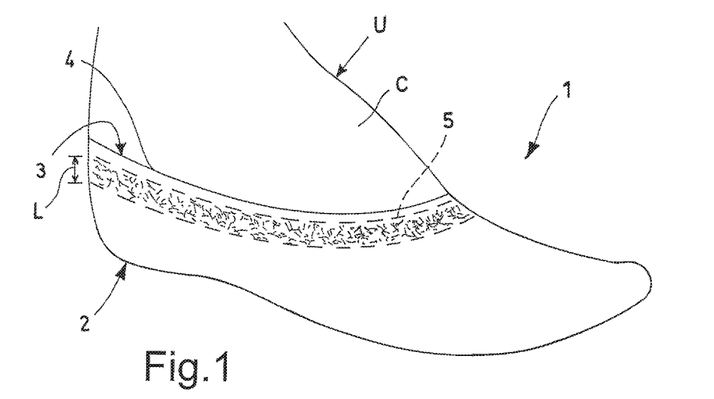
FIG. 1 is a schematic representation of a half foot sock or "invisible socks" in the worn condition.

As observable in FIG. 1, the slip-resistant garment 1 comprises a textile structure 2 which delimits a cavity for engaging a part of the body C of a user U, in the specific case of the lower portion of the foot of the same.

The cavity of the textile structure 2 terminates at an access opening 3 defined by a respective edge 4 of the textile structure 2 which, with reference to the "invisible sock" illustrated in FIG. 1, is arranged to engage the foot of the user U below the malleolus.

With the aim of guaranteeing stable engagement between the textile structure 2 and the body C of the user U, the slip-resistant garment 1 advantageously comprises at least one slip-resistant portion 5 adapted to engage, preferably directly, the skin of the body C of the user U.

In detail, the slip-resistant portion 5 of the slip-resistant garment 1 is preferably arranged on the textile structure 2 inside the cavity defined thereby so as to directly engage the foot of the user U.

As observable in FIG. 1 the slip-resistant portion 1 is preferably applied to the textile structure 2 at the edge 4 of the access opening 3 to guarantee the stable position thereof during the use of the garment 1.

However, it is not excluded, still for the sake of stability between the garment 1 and the body C of the user U, that the slip-resistant portion 5 be applied in other parts of the cavity of the garment 1.

In addition, it is possible to provide for that the garment 1 be provided with several slip-resistant portions 5 cooperating to increase the stability of the garment 1 with respect to the body C of the user U.

Advantageously, the slip-resistant portion 5 extends along the entire development of the edge 4 of the opening 3 of the garment 1.

Advantageously, the slip-resistant portion is applied to the garment in the form of a continuous layer. However, it is not excluded that the slip-resistant portion can be obtained by applying the slip-resistant polymeric material in a discontinuous manner, i.e. by applying the material on a given portion of the garment (application portion) so as to have a plurality of areas of said application portion covered by said slip-resistant material (slip-resistant areas), each of said slip-resistant areas being adjacent to areas of the same non-slip-resistant application portion.

The slip-resistant portion 5 has a width "L" sufficient to guarantee a stable engagement between the garment 1 and the body C of the user U, preferably comprised between 1 mm and 50 mm, preferably equivalent to 20 mm.

Figure 2:
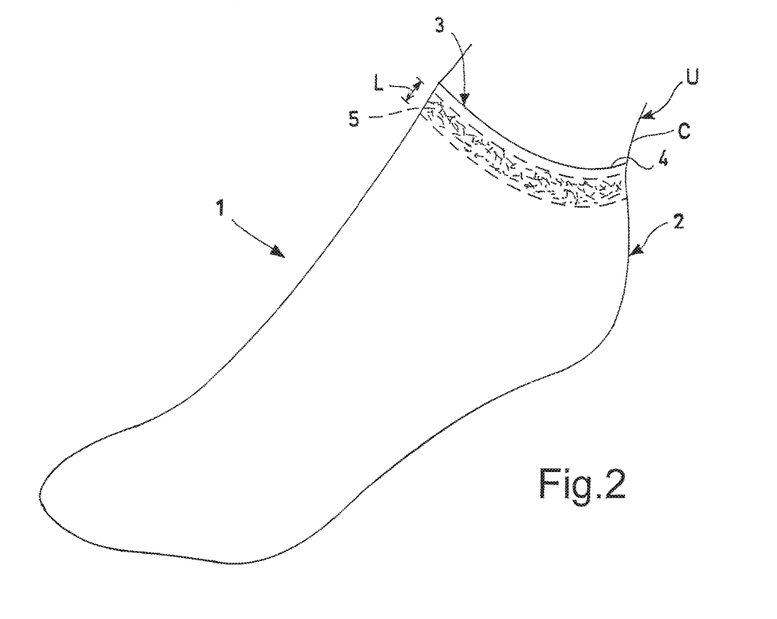
FIG. 2 is a schematic representation of a short sock, also worn.

According to the embodiment solution illustrated in FIG. 2, the slip-resistant garment 1 is a short sock, whose textile structure 2 is quite similar to the textile structure 2 of the slip-resistant garment 1 illustrated in FIG. 1.

Actually, even the textile structure 2 of the short sock of FIG. 2, has a cavity which terminates with an access opening 3 defined by a respective edge 4, arranged to lie at or above the malleolus of the foot of the user U.

Even as regards the embodiment illustrated in FIG. 2, it is possible to identify an identical slip-resistant portion 5.

Figure 3:
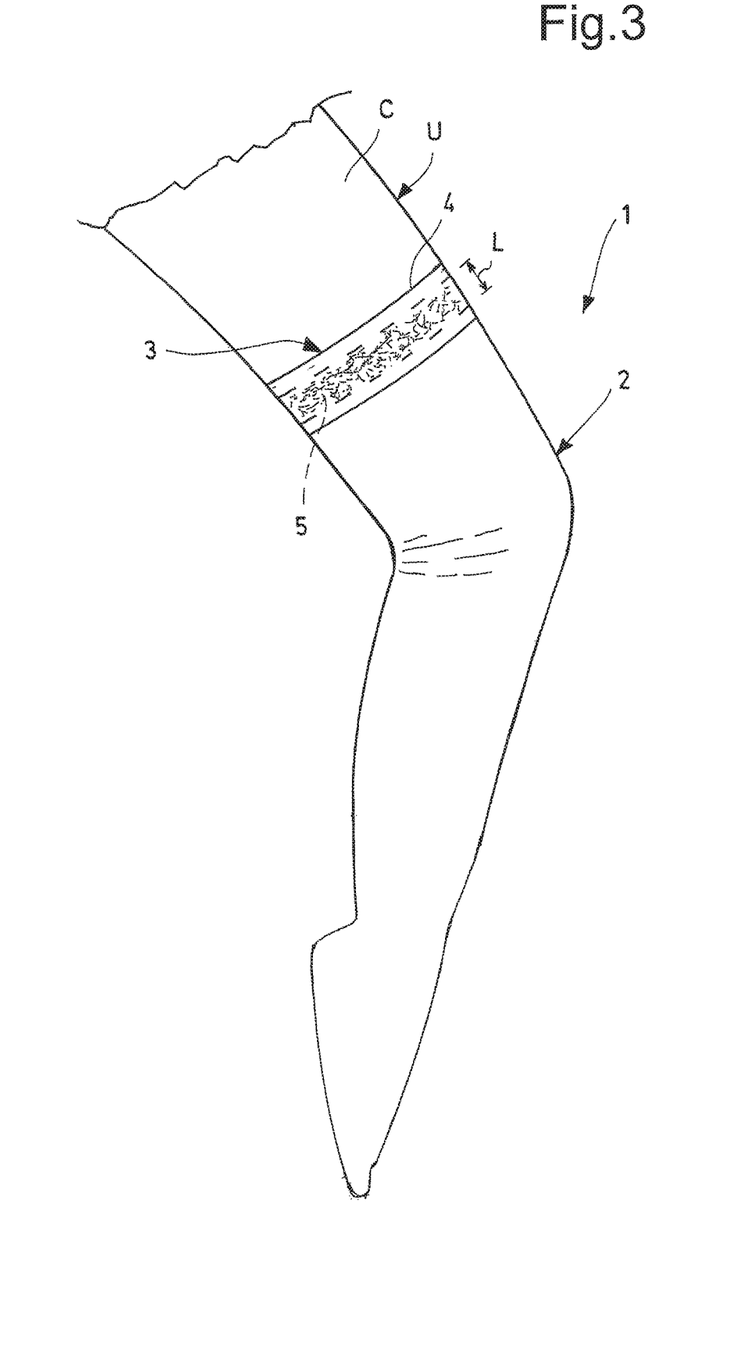
FIG. 3 is a schematic representation of a pantyhose or thigh high stocks, also worn.

According to the embodiment solution illustrated in FIG. 3, the slip-resistant garment 1 is a pantyhose or thigh high stockings, whose structural characteristics are similar to the structural characteristics of the garments 1 represented in FIGS. 1 and 2.

Actually, even the slip-resistant garment 1 of FIG. 3 is provided with a textile structure 2 which delimits a cavity for the engagement of the leg of the user U. The cavity terminates with an access opening 3 defined by a respective edge 4 at which there is engaged a slip-resistant portion 5 identical to that of the other embodiments.

Figure 4:
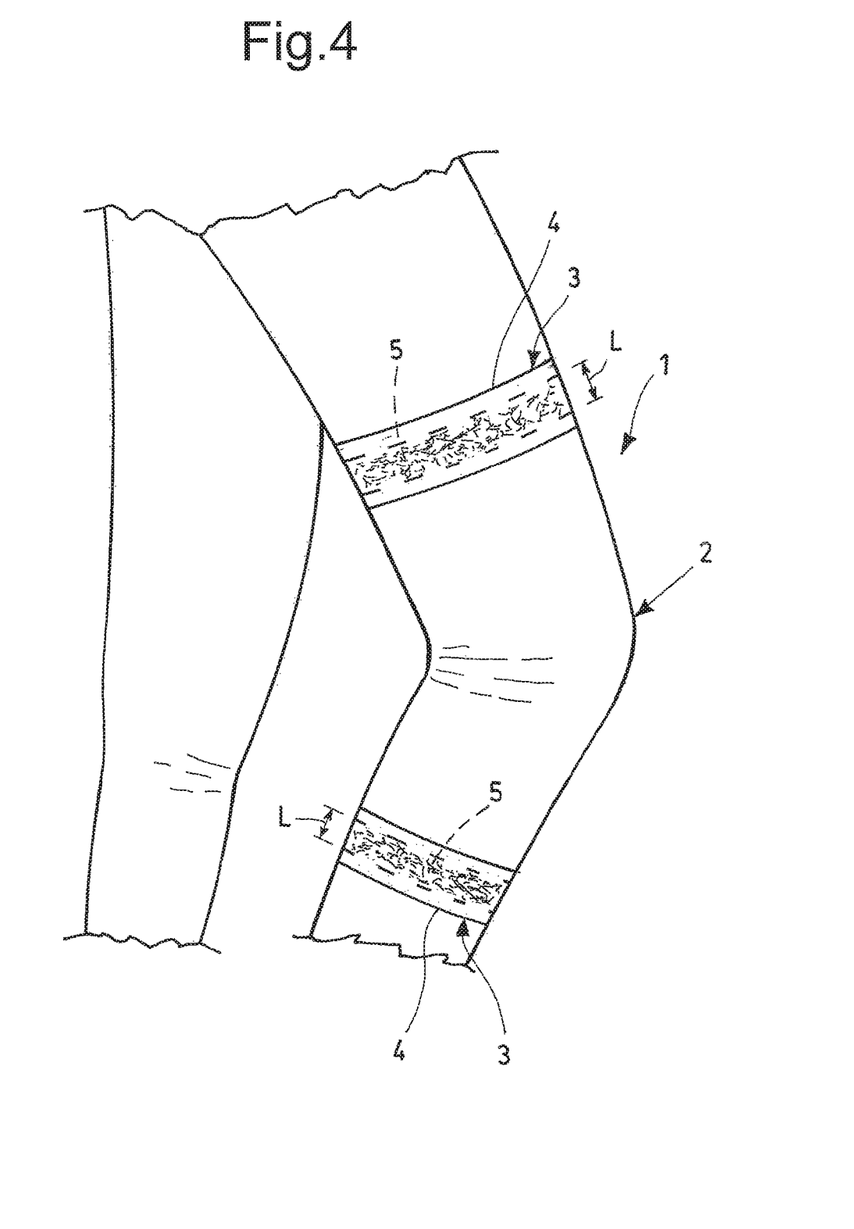
FIG. 4 is a schematic representation of a medical band or brace, also worn.

According to the embodiment illustrated in FIG. 4, the slip-resistant garment 1 is a medical band or a brace or a similar garment, whose textile structure 2 is substantially tubular-shaped, in that it provides for the introduction, with the complete traversing of the garment 1, of a part of the body C of the user U.

In this case, the textile structure 2, defines a cavity which terminates with two access openings 3, arranged on opposite sides, each of which is defined by a respective edge 4.

As observable in FIG. 4, the garment 1 is provided with at least one slip-resistant portion 5 arranged at a respective access opening 3, preferably of a slip-resistant portion 5 arranged at each of the access openings 3 of the garment 1.

Preferably, the slip-resistant portions 5 of the garment 1 subject of FIG. 4 are identical to the slip-resistant portions provided for on the embodiments subject of FIGS. 1 to 3.

Figure 5:
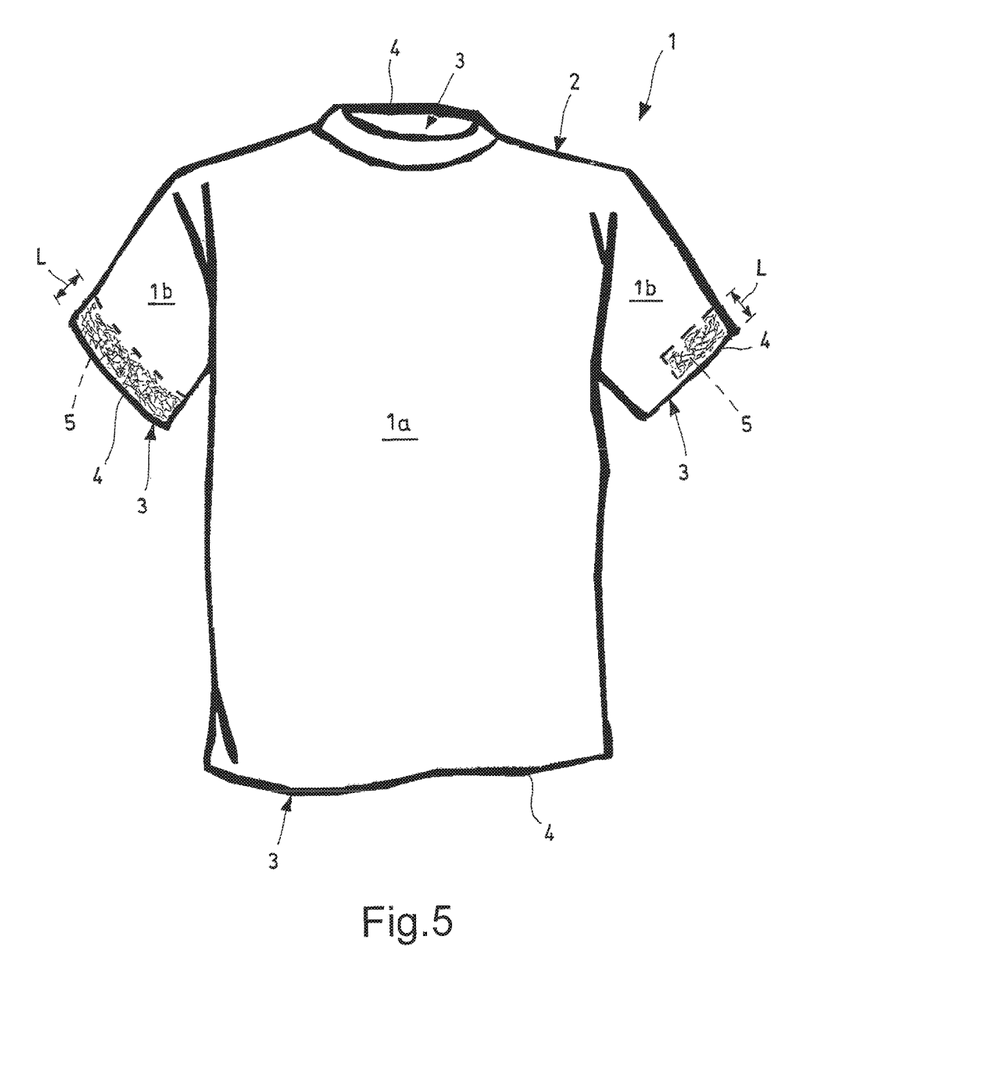
FIG. 5 is a schematic representation of a jersey.

According to the embodiment subject of FIG. 5, the slip-resistant garment 1 is a jersey or a similar garment.

In this case, the textile structure 2 of the garment 1 has three substantially tubular portions 1a, 1b, respectively a central portion 1a and two lateral portions 1b corresponding to sleeves, joined to each other to define a cavity provided with four openings 3, each portion being defined by a respective edge 4 for the insertion of the relative parts of the body of the user.

Still with reference to FIG. 5, the garment 1 is provided with at least one slip-resistant portion 5 arranged at at least one of the openings 3 provided for. Preferably, the garment 1 comprises two slip-resistant portions 5, one for each sleeve.

It is not excluded that the other openings 3 of the garment 1 be provided with a respective slip-resistant portion 5 capable of directly engaging the body of the user.

Each slip-resistant portion 5 may extend along the entire development of the edge 4 of the respective opening 3 (left sleeve 1a) or only along one part of thereof (right sleeve 1a) depending on the type of engagement intended to be established between the textile structure 2 of the garment 1 and the body of the user.

Though the illustrated embodiments refer to particular embodiments of garments, it should be observed that the aforementioned slip-resistant portions 5 may be applied to any type of garment, clothes or wearable items, which provide for areas at direct contact with the body of the users or at contact with an underlying textile substrate (for example, another garment).

Advantageously, the position and conformation of such slip-resistant portions 5 may vary depending on the type of garments on which they should be applied and the friction action intended to be produced between the body of the user and the textile structure of the garment.

According to the present invention, the slip-resistant portion comprises at least one thermoplastic polymer selected from among:

(a) block copolymers of styrene;

(b) copolymers of ethylene with at least one $C_3$-$C_{12}$ alpha-olefin (EPR), possibly with at least one dienic termonomer (EPDM);

(c) copolymers of at least one butene with at least one diene, namely saturated or semi-saturated copolymers of the 1-butene, 2-butene or isobutene (butyl rubbers);

(d) copolymers of ethylene with at least one ester having an ethylene unsaturation selected from among: $C_1$-$C_8$ alkyl acrylates, $C_1$-$C_8$ alkyl methacrylates and vinyl $C_2$-$C_8$ carboxylates.

Within the present description and claims, the expression "phr" ("per hundred rubber") is used to indicate the amount of a given component present in the thermoplastic material, expressed in parts per weight with respect to 100 parts by weight of the thermoplastic polymer.

In some applications the thermoplastic polymer may be a cross-linked or partly cross-linked elastomeric material. The degree of the cross-link determines the elastic return performance of the slip-resistant portion.

Preferably, the thermoplastic polymer is a block copolymer of styrene selected from among: styrene/ethylene/butadiene/styrene (SEBS), styrene/ethylene/propylene/styrene (SEPS), styrene/ethylene/butadiene/propylene/styrene (SEBPS), styrene/butadiene/styrene (SBS), styrene/isoprene/styrene (SIS), styrene/isobutylene/styrene (SIBS), or their mixtures.

Even more preferably, the elastomeric material is selected from among SEBS, SEPS, SBS and their mixtures. SEBS and SEPS are particularly preferred, in that the slip-resistant portion which is obtained has a greater resistance to age and yellowing, for example, following exposure to UV rays.

Preferably, the thermoplastic polymer is a copolymer with blocks of styrene having Shore hardness A (measured according to ASTM 2240 or ISO 7619) from 20 to 90, preferably from 35 to 70.

The styrene block copolymers preferably have a styrene content variable between 5% and 50% by weight with respect to the weight of the elastomer more preferably between 8% and 40%, even more preferably between 15% and 35%.

SEBS elastomers particularly adapted for the present invention are available in the market under the trade names Kraton®-G (Shell Chemical Co.), Tuftec®-H (Asahi Kasei Chemicals Co.), Calprene-H (Dynasol), Europrene SOL TH (Versalis), Septon (Kuraray).

Alternatively, the thermoplastic polymer may be selected from among the copolymers of ethylene with at least one $C_3$-$C_{12}$ alpha-olefin (b). Among these, the following shall be preferred: ethylene-propylene (EPR), ethylene-propylene-diene (EPDM), ethylene-1-butene, ethylene-1-octene and their mixtures.

As regards the copolymers (c)—butyl rubbers—of at least one butene (e.g. 1-butene, 2-butene or isobutene) with at least one diene, particularly preferred are copolymers from among isobutene and isoprene. In these copolymers isoprene is present preferably at amounts equal to or lesser than 5% by weight, more preferably equal to or less than 3% by weight.

The dienic termonomers possibly present in the copolymers (b) of ethylene with at least one $C_3$-$C_{12}$ alpha-olefin may be conjugated or not conjugated. Said termonomers, may be selected, for example, from among: 1,3-butadiene, 1,4-hexadiene, 1-6-octadiene and the like; monocylic or polycyclic dienes, such as for example 1,4-ciclohexadiene and 5-ethylidene-2-norbornene.

As regards the copolymers (d) of ethylene obtained from the polymerisation of ethylene with at least one ester having an ethylene unsaturation, they are preferably copolymers of ethylene with at least one ester selected from among $C_1$-$C_8$ (preferably $C_1$-$C_4$) alkyl acrylates, $C_1$-$C_8$ (preferably $C_1$-$C_4$) alkyl methacrylates, and vinyl $C_2$-$C_8$ (preferably $C_2$-$C_6$) carboxylates. The amount of ester present in the copolymer is preferably in the range between 5%-50% by weight, preferably 15%-40% by weight.

Examples of $C_1$-$C_8$ acrylates and methacrylates are: ethyl acrylate, methyl acrylate, methyl methacrylate, tert-butyl acrylate, n-butyl acrylate, n-butyl methacrylate, 2-ethylhexyl acrylate, and the like.

Examples of vinyl $C_2$-$C_8$ carboxylates are: vinyl acetate, vinyl propionate, vinyl butyrate, and the like.

Advantageously, the slip-resistant properties of the thermoplastic material according to the present invention, may be modulated according to the application needs, adding to the thermoplastic polymer one or more further compounds.

The properties of the slip-resistant portion according to the present invention may be modulated, for example, by adding to said thermoplastic material one or more hydrocarbon resins. Preferably, the slip-resistant portion comprises from 1 to 50 phr, more preferably from 5 to 30 phr, even more preferably from 5 to 20 phr of at least one hydrocarbon resin. The hydrocarbon resin may be solid or liquid at room temperature. Preferably, the hydrocarbon resin has a maximum softening point not exceeding 150° C., more preferably between 90° C. and 110° C. (measured according to the ASTM E-28 method, Ring-and-ball Softening Point). In the case of liquid hydrocarbon resins, the concentration thereof in the slip-resistant portion is preferably comprised in the range between 1-25 phr.

The hydrocarbon resin, which is a tackifier compound, allows modifying the surface friction of the thermoplastic material of the slip-resistant portion with respect to the surface of the material with which this comes to contact, thus varying the slipping capacity thereof with respect to the latter.

The hydrocarbon resins are generally aliphatic and/or aromatic resins obtained through the polymerisation of hydrocarbon cuts deriving from the oil refinery processes. The resins may be at least partly hydrogenated. They are available in the market for example under the trade names Regalite™, Eastotac™ (Eastman), Norsolene (Total), Escorez (Exxon), ecc.

The slip-resistant portion may further comprise from 10 to 250 phr, preferably from 30 to 120 phr, of at least one plasticiser selected from among: paraffinic oils, naphthenic oils, polyolefin oils and their mixtures. Generally, these are products of petroleum origin, available in the market for example under the trade name Nyflex™ or Nytex™ (Nynas), Ondina (Shell), OB (Roloil).

The plasticiser allows modulating the Shore hardness A and the elasticity module of the thermoplastic material, so as to adapt the characteristics of the slip-resistant portion to the softness and extensibility characteristics of the textile structure on which it is applied.

The slip-resistant portion may also comprise from 1 to 50 phr, more preferably from 5 to 30 phr, of at least one polyisobutene (PIB), having preferably an average molecular weight (weight average Mw measured through GPC) from 100 to 2500000, more preferably between 200 and 500000, even more preferably between 800 and 100000. Polyisobutenes useable for the present invention are available in the market under the trade names Oppanol B (Basf), Indopol (Ineos) and Poly Butene (Daelym).

The PIB allows modulating the degree of friction exerted by the slip-resistant portion on the material with which it comes to contact. In addition, the PIB, in combination with the hydrocarbon resin, confers to the slip-resistant portion water repellent characteristics, and thus resistance to washing; furthermore the slip-resistant portion tends to accumulate lower amounts of impurities (e.g. fabric threads, dust, etc.).

By adding suitable amounts of the aforementioned plasticisers, as well as the hydrocarbon and/or polyisobutene resins, also allow regulating the viscosity of the formulate. This is useful, for example, for regulating the degree of sinking of the material which forms the slip-resistant portion in the textile support or the force of adhesion thereof to the same support, in particular upon application through hot pressing.

In order to further facilitate the anchoring of the slip-resistant portion to some textile substrates, the slip-resistant portion may also comprise one or more functionalised olefin polymers, for example with maleic functionalities or the like. Examples of olefin polymers that can be functionalised are polyethylene, polypropylene, EPDM and EVA. Typically, in the polymers having maleic functionalities, such functionalities are comprised in variable percentages in the range between 0.1%-3% by weight, preferably in the range between 0.3%-1.5% by weight with respect to the weight of the functionalised polymer. These polymers are available in the market for example under the trade names Orevac-Lotader (Archema), Exxelor (Exxon), Bynel-Fusabond-Elvaloy (Du Pont), etc.

Preferably, the slip-resistant portion comprises one or more functionalised olefin polymers at an overall amount of 0.5-50 phr.

The slip-resistant portion may also comprise other additives, such as: antioxidants, colouring agents, pigments, UV stabilisers, reinforcing fillers, etc.

The production of the slip-resistant portion according to the present invention may occur according to the conventional techniques in the thermoplastic products processing industry (extruders, blenders, mixers, drawers, dissolvers, etc.). For example, the slip-resistant portion may be produced through mixing at the molten state of the thermoplastic polymer with possibly one or more additives from among those mentioned above, and subsequently extruded, co-extruded, calendared, spread with a doctor blade or moulded in form of a thin layer (film), so as to obtain a thermoplastic product having the desired thickness and from which it is possible to obtain the slip-resistant portion with suitable dimensions and shape.

The thickness of the slip-resistant portion is preferably comprised in the range between 20 micrometers and 5 mm, preferably in the range between 100 micrometers and 0.5 mm. The shape and dimension of the slip-resistant portion may vary as a function of the specific application it is intended for.

In a preferred embodiment, the slip-resistant portion is obtained in form of a tape. The dimensions of the tape may vary within wide intervals as a function of the specific use. For example, the tape may have length in the range between 1 cm-100 cm, more preferably in the range between 10 cm-80 cm, and a width preferably in the range between 0.5 cm-20 cm, more preferably in the range between 1 cm-5 cm.

The tape may be cut into slip-resistant portions with desired shape and dimensions.

One of the main advantages of the slip-resistant portions according to the present invention lies in the fact that they can be directly fixed on the textile structure of the garment intended to be conferred slip-resistant properties by hot pressing the aforementioned slip-resistant portion on the surface of the textile structure. For such purpose there can be used conventional apparatuses, such as for example continuous thermowelding apparatuses, heated pressing plate flat presses or other techniques using similar devices.

The material of the slip-resistant portion may also be deposited on the textile structure in fluid form, through extrusion, and then cooled up to solidification. Further techniques of application of the slip-resistant portions to the textile structures are calendering and spreading with a doctor blade.

In an alternative embodiment, the slip-resistant portion may be applied through the aforementioned techniques on a support substrate (e.g. a TNT, cotton, jersey, Lycra leaf etc.) before being applied to the garment.

The slip-resistant portion together with the support substrate may thus be fixed to the garment in various ways, for example with mechanical means, such as sewing, hemming, or using an adhesive. Possibly, the support substrate may be removed before fixing the slip-resistant portion to the garment.

The present invention shows various advantages with respect to the prior art. The slip-resistant portions according to the present invention are efficient at maintaining the garments on which they are applied in the position in which they are worn, preventing or reducing the slipping thereof on the skin or on other textile substrates.

In particular, when the slip-resistant garment is worn at direct contact with the skin, it remains in the worn position mainly due to friction on the skin exerted by the polymeric material of the slip-resistant portion.

In case of tight garments (e.g. stockings, pantyhose, braces), such a property of the anti-slipping material according to the present invention allows the use of slip-resistant portions which exert a considerably low compression action on the body of the user, though efficiently countering the slipping of the garment, thus avoiding the "tourniquet" effect.

Given that the material that forms the slip-resistant portion has high elasticity, it can be advantageously applied to elastic garments, without altering the original elastic characteristics of the latter. In addition, the material which forms the slip-resistant portion is characterised by a high resistance to wear and washing, so that the performance characteristics substantially last unaltered over the entire useful life of the garment.

Being made of a silicone polymer-free material, the slip-resistant garments according to the present invention may also be worn by people allergic or hypersensitive to these materials.

In addition, when applied to the garments in the form of a continuous, flat and low thickness layer, the slip-resistant portions have surfaces that are very smooth and substantially without harshness. The absence of harshness reduces skin irritation even when the slip-resistant garment is used for performing long duration activities or activities that imply considerable sweating. In addition, such characteristics of the slip-resistant portion allow obtaining high quality slip-resistant garments in that the fixing thereof to the textile structure does not considerably alter the initial characteristics of the garment (e.g. hand and thickness).

In addition, the slip-resistant properties of the slip-resistant portion according to the present invention may be advantageously modulated as a function of the application needs of the slip-resistant portion.

The processes for manufacturing and fixing of the slip-resistant material according to the present invention to the garments are extremely simple to obtain and does not produce bad smelling or hazardous emissions, like it instead occurs in the processes for manufacturing the silicone slip-resistant materials.

The following examples are provided solely for the sake of exemplification of the present invention and thus they shall not be deemed as limiting with respect to the scope of protection defined by the attached claims.

EXAMPLES

Through a co-rotating twin-screw mixer, there were prepared the polymer compositions as indicated in Table 1 (amounts expressed in phr):

TABLE 1

|  | Sample 1 | | Sample 2 | | Sample 3 | |
| --- | --- | --- | --- | --- | --- | --- |
|  | phr | wt % | phr | wt % | phr | wt % |
| Europrene SOL TH 2315 [1] | 31 | 11.7 | 31 | 11.7 | 32.7 | 11.7 |
| Kraton G1651 [1] | 69 | 26 | 69 | 26 | 67.3 | 24 |
| Nytex 820 [2] | 164 | 62 | 151 | 57 | 140 | 50 |
| Indopol H-1200 [3] | — | — | 13.3 | 5 | — | — |
| Eastotac H-100W [4] | — | — | — | — | 39 | 14 |
| Irganox 1010 [5] | 0.8 | 0.3 | 0.8 | 0.3 | 0.8 | 0.3 |

[1] copolymer SEBS (about 32% by weight of bounded styrene);
[2] paraffinic/naphthenic oil;
[3] polyisobutene (medium molecular weight $M_w$ equivalent to 2100 g/mol);
[4] hydrogenated hydrocarbon resin, having a softening point (measured according to the ASTM method E-28, Ring-and-ball Softening Point) = 100° C.;
[5] sterically hindered primary phenolic antioxidant.

Each of the three formulations of Table 1 was extruded in form of a tape with thickness equivalent to about 200 μm. From the tape there were obtained specimens measuring about 80×80 mm.

On each of the Samples 1-3 there were determined, the coefficient of static and dynamic friction and the average dynamic load according to the ASTM D1894-11 method, evaluating the slipping friction, over a metal surface, of a slide of pre-established dimensions and weight, whose slipping base was previously covered by each of the specimens prepared previously. The results are indicated in Table 2.

On each of the three samples it was further determined the percentage value of elongation at break, the modulus of elongation for a 100% and 300% extension according to the UNI EN ISO 527-3/2/200 method. The results are indicated in Table 3.

TABLE 2

| Sample No | Coefficient of static friction | Coefficient of dynamic friction | Average dynamic load (N) |
| --- | --- | --- | --- |
| 1 | 4.30 | 3.98 | 8.78 |
| 2 | 5.03 | 4.52 | 9.71 |
| 3 | 6.79 | 5.26 | 13.86 |

TABLE 3

| Sample No | Elongation at break (%) | Modulus of elongation 100% (MPa) | Modulus of elongation 300% (MPa) |
| --- | --- | --- | --- |
| 1 | 1080 | 0.22 | 0.36 |
| 2 | 1012 | 0.29 | 0.41 |
| 3 | 958 | 0.33 | 0.56 |

The experimental results confirm that the materials according to the present invention have an optimal coefficient of static and dynamic friction for use as slip-resistant portion for preventing the slipping of garments on the skin or textile substrates.

In addition, the elastic properties of these materials are such to allow the use also on elastic textile substrates.

In addition, the friction, and thus the slip-resistant properties, may be modulated according to the application needs, as shown by the increase of the friction value with respect to sample 1 (which can for example be used for stockings and pantyhose) which can be obtained by addition of polyisobutene or hydrocarbon resins (samples 2 and 3, which can for example be used for sports attire and braces in the medical industry) in the formulation.

The invention claimed is:

1. A slip-resistant garment, comprising:
   at least one textile structure; and
   at least one slip-resistant portion coupled to the at least one textile structure;
   wherein the at least one slip-resistant portion comprises at least one thermoplastic polymer selected from the group consisting of:
   (a) block copolymers of styrene;
   (b) copolymers of ethylene with at least one $C_3$-$C_{12}$ alpha-olefin;
   (c) copolymers of at least one butene with at least one diene; or
   (d) copolymers of ethylene with at least one ester having an ethylene unsaturation selected from the group consisting of: $C_1$-$C_8$ alkyl acrylate, $C_1$-$C_8$ alkyl methacrylates, or vinyl $C_2$-$C_8$ carboxylates; and
   wherein the at least one slip-resistant portion further comprises at least one tape coupled to the at least one textile structure by hot pressing the at least one tape on the at least one textile structure.

2. The garment of claim 1, wherein the at least one thermoplastic polymer is a block copolymer of styrene selected from the group consisting of:
   styrene/butadiene/styrene (SBS);
   styrene/ethylene/butadiene/styrene (SEBS);
   styrene/ethylene/propylene/styrene (SEPS);
   styrene/ethylene/butadiene/propylene/styrene (SEBPS);
   styrene/isoprene/styrene (SIS);
   styrene/isobutylene/styrene (SIBS); or
   mixtures thereof.

3. The garment of claim 1, wherein the at least one thermoplastic polymer is a block copolymer of styrene having Shore A hardness (measured according to ASTM 2240 or ISO 7619) greater than or equal to 20 and less than or equal to 90.

4. The garment of claim 1, wherein the at least one slip-resistant portion further comprises greater than or equal to 1 per hundred rubber (phr) and less than or equal to 50 phr of at least one polyisobutene.

5. The garment of claim 1, wherein the at least one slip-resistant portion further comprises greater than or equal to 1 per hundred rubber (phr) and less than or equal to 50 phr of at least one hydrocarbon resin.

6. The garment of claim 1, wherein the at least one slip-resistant portion comprises greater than or equal to 10 per hundred rubber (phr) and less than or equal to 250 phr of at least one plasticiser selected from the group consisting of paraffinic oils, naphthenic oils, or polyolefinic oils.

7. The garment of claim 1, wherein the at least one slip-resistant portion comprises greater than or equal to 0.5 per hundred rubber (phr) and less than or equal to 50 phr of at least one functionalized polyolefin.

8. The garment of claim 1, wherein the
at least one tape has a thickness greater than or equal to 0.02 mm and less than or equal to 5 mm.

9. The garment of claim 1, wherein the at least one slip-resistant portion is at an edge of at least one access opening of the garment.

10. The garment of claim 1, wherein the garment is a jersey, trousers, stockings, pantyhose, shapewear garment, a containment garment, a formal garment, or a brace for immobilising or supporting joints.

11. A process for manufacturing a slip-resistant garment, the process comprising:
providing at least one textile structure; and
coupling at least one slip-resistant portion to the at least one textile structure;
wherein the at least one slip-resistant portion comprises at least one thermoplastic polymer selected from the group consisting of:
(a) block copolymers of styrene;
(b) copolymers of ethylene with at least one $C_3$-$C_{12}$ alpha-olefin;
(c) copolymers of at least one butene with at least one diene; or
(d) copolymers of ethylene with at least one ester having an ethylene unsaturation selected from the group consisting of: $C_1$-$C_8$ alkyl acrylates, $C_1$-$C_8$ alkyl methacrylates, or vinyl $C_2$-$C_8$ carboxylates;
wherein the at least one slip-resistant portion further comprises at least one tape, and
wherein the coupling of the at least one slip-resistant portion to the at least one textile structure comprises hot pressing the at least one tape on the at least one textile structure.

12. A process for using polymeric material, the process comprising:
incorporating the polymeric material into a garment;
wherein the polymeric material is configured to reduce or prevent slipping of the garment on skin or on a textile substrate, and
wherein the polymeric material comprises at least one thermoplastic polymer selected from the group consisting of:
(a) block copolymers of styrene;
(b) copolymers of ethylene with at least one $C_3$-$C_{12}$ alpha-olefin;
(c) copolymers of at least one butene with at least one diene; or
(d) copolymers of ethylene with at least one ester having an ethylene unsaturation selected from the group consisting of: $C_1$-$C_8$ alkyl acrylates, $C_1$-$C_8$ alkyl methacrylates, or vinyl $C_2$-$C_8$ carboxylates; and
wherein the polymeric material further comprises at least one tape coupled to the garment by hot pressing the at least one tape on the garment.

13. The garment of claim 1, wherein the copolymers of ethylene with at least one $C_3$-$C_{12}$ alpha-olefin further comprise at least one dienic termonomer.

14. The garment of claim 1, wherein the at least one thermoplastic polymer is a block copolymer of styrene having Shore A hardness (measured according to ASTM 2240 or ISO 7619) greater than or equal to 35 and less than or equal to 70.

15. The garment of claim 4, wherein the at least one polyisobutene has a molecular weight (Mw) greater than or equal to 100 and less than or equal to 2,500,000.

16. The garment of claim 1, wherein the at least one slip-resistant portion comprises greater than or equal to 0.5 per hundred rubber (phr) and less than or equal to 50 phr of a maleated polyolefin.

17. The garment of claim 1, wherein the at least one
tape has a thickness greater than or equal to 0.1 mm and less than or equal to 2 mm.

18. The garment of claim 1, wherein the at least one tape has a width greater than or equal to 5 mm and less than or equal to 200 mm.

19. The process of claim 11, wherein the copolymers of ethylene with at least one $C_3$-$C_{12}$ alpha-olefin further comprise at least one dienic termonomer.

20. The process of claim 12, wherein the copolymers of ethylene with at least one $C_3$-$C_{12}$ alpha-olefin further comprise at least one dienic termonomer.

* * * * *